Oct. 23, 1951 R. C. MOORE 2,572,179

PEAK LEVELING CIRCUIT

Filed May 24, 1949

INVENTOR.
ROBERT C. MOORE
BY
Brown, Denk & Synnestvedt
AGENTS

Patented Oct. 23, 1951 2,572,179

UNITED STATES PATENT OFFICE 2,572,179

PEAK LEVELING CIRCUIT

Robert C. Moore, Erdenheim, Pa., assignor to Philco Corporation, Philadelphia, Pa., a corporation of Pennsylvania Application May 24, 1949, Serial No. 95,052

1 Claim. (Cl. 178—7.3)

The present invention relates to television receiving systems, and more particularly relates to an improved circuit for reinserting in such systems the direct-current component of the composite video signal.

In present-day television transmitting systems, a camera or pick-up tube is frequently utilized to convert the optical image to be televised into a corresponding image in stored electrostatic charge. This charge image, which is formed on the mosaic of the camera tube, is then scanned by an electron beam to develop an output voltage variation the instantaneous value of which is dependent upon the electrostatic potential possessed by the particular area of the mosaic then under the scanning beam. This potential, in turn, is representative of the brilliance of a specific point on the optical image.

In order that the output voltage from the camera tube may contain all of the information derived from such scanning of the mosaic, it must vary over a wide band of frequencies. This band may have an upper limit in the order of six megacycles, for example, and a lower limit as far down as direct current—that is, zero frequency. While the upper portion of this frequency band conveys the electrical counterpart of variations in light intensity occurring from one elemental area of the optical image to the next, the lower frequencies, on the other hand, are those which contain information regarding the background illumination of the image. In other words, they indicate its average brilliance as opposed to its detailed illumination. Accordingly, an image that is predominantly black or dark in color will produce a low-frequency component which is different from that which is produced by an image having a predominantly light background.

It is, of course, necessary that the high frequencies in the video signal be adequately transmitted and received in order to reproduce the picture details. It is equally necessary, however, that the low frequencies in the video signal, which represent the average brilliance of the picture, be similarly transmitted and received so that the reproduced image will be a true representation of the original subject.

Under present standards of transmission, each cycle of the composite television signal includes a portion which is utilized to convey the video information, and another portion in which an impulse is transmitted which is utilized to synchronize the operation of the scanning generators at the receiver with the corresponding scanning generators at the transmitter. Each such synchronizing impulse is of rather short duration as compared to the video signal interval, and during this synchronizing period the transmitter is operated at its maximum power output. In other words, each synchronizing impulse is transmitted at full carrier amplitude. The level of the blanking signals, which are transmitted during the retrace period of each line-deflection cycle, is arbitrarily set at approximately 75% of this maximum transmitter power, while signals representative of white in the image are transmitted at values representative of greater degrees of modulation. It will thus be seen that both the synchronizing impulses and the blanking signals are of predetermined amplitude, and undergo no appreciable variation as long as the maximum power output of the transmitter remains substantially unchanged.

Accordingly, either the tips of the synchronizing pulses, or the blanking signal pedestals upon which the synchronizing pulses are positioned (which pedestals coincide with the black level of the signal) are suitable for use as a reference level to which the alternating current axis of the video signal may be related. A picture that is predominantly black, for example, should normally have its A.-C. axis occupy a position relatively closer to the level represented by black than is the case with a picture that is predominantly white.

The composite video signal output of the television transmitter has the A.-C. axis of the video signal properly related to black level in the waveform. This is due to the fact that the direct-current component of the signal is normally added at the transmitter just prior to the point at which the intelligence modulates the conventional radio-frequency oscillator. As a result, the low-frequency information, which was removed from the output of the camera tube due to passage of the signal wave through the usual capacitively-coupled video amplifier circuits, is restored. Thus this D.-C. component is present in the transmitted signal and also at the point where such signal is picked up by a receiver.

The latter, however, customarily contains another series of capacitively-coupled video amplifier stages, which act to remove this D.-C. component from the composite signal in the same way that it was removed by these similar units at the transmitter. Consequently, some means must be provided for restoring the low-frequency information to the signals. Failure to do so would mean that the A.-C. axis of the video signal is not correctly positioned with respect to a given reference voltage such as black, and, as a result, each image reproduced by the receiver will contain the same average amount of light regardless of the overall brilliance of the particular object being televised at the transmitter. For example, when the direct-current component of the signal is not present, a scene having a large number of white areas appears much less brilliant on the screen of the image-reproducing tube, and similarly, a scene in which dark areas predominate appears to be considerably lighter in color than is actually the case. In other words, the insertion of a brightness component shifts the A.-C. axis of the video signal with respect to a fixed reference level, thus varying the bias between the cathode and control electrode of the image-reproducing tube so as to alter the average brilliance of the reproduced image.

While it is customary to employ some form of so-called D.-C. inserter circuit in commercial television receivers, nevertheless the operation of many of these circuits is rendered unsatisfactory by the reception of noise or other spurious impulses which may be received along with the video signal. Since a majority of these standard circuits employ a rectifying device in combination with a condenser to develop a charge on the latter the value of which is representative of the average value of the composite video signal, the presence of noise impulses of large amplitude may cause a relatively large variation in this developed voltage. Although most noise or other interference is of relatively short duration, nevertheless the fact that it may be of high amplitude causes the energy content thereof to be considerable. Thus in the presence of noise or other interference the conventional D.-C. inserting circuit is caused to develop a voltage which is not truly representative of the D.-C. information in the signal, resulting in an inaccurately reproduced image.

One object of the present invention, therefore, is to provide an improved form of D.-C. inserting circuit for television receivers.

Another object of the invention is to provide a D.-C. inserting circuit in which the position of the alternating current axis of the video signal is properly related to a given reference level, regardless of the presence of noise or other spurious impulses received during the video signal interval.

A further object of the invention resides in the provision of a D.-C. inserting circuit for television receivers in which the amplitude of any noise occurring during the picture interval is limited substantially to the amplitude of the synchronizing impulses.

Other objects and advantages will be apparent from the following description of preferred forms of the invention and from the drawing, in which.

To the foregoing general ends it is a feature of the present invention to provide, in a television receiver wherein a composite television signal is present which lacks a D.-C. component but which may include spurious impulses having a peak amplitude greater than the peak amplitude of the television signal itself, a clipping device for limiting the amplitude of the spurious impulses substantially to the peak amplitude of the television signal, a D.-C. restorer circuit energized by the output of the clipping device, and means for applying the output of the D.-C. restorer circuit to the clipping device to regulate its clipping level, whereby the spurious impulses are so limited in amplitude by the clipping device as not to affect to an appreciable extent the output of the D.-C. restorer circuit and hence the clipping level of the clipping device.

Figures 1, 3:
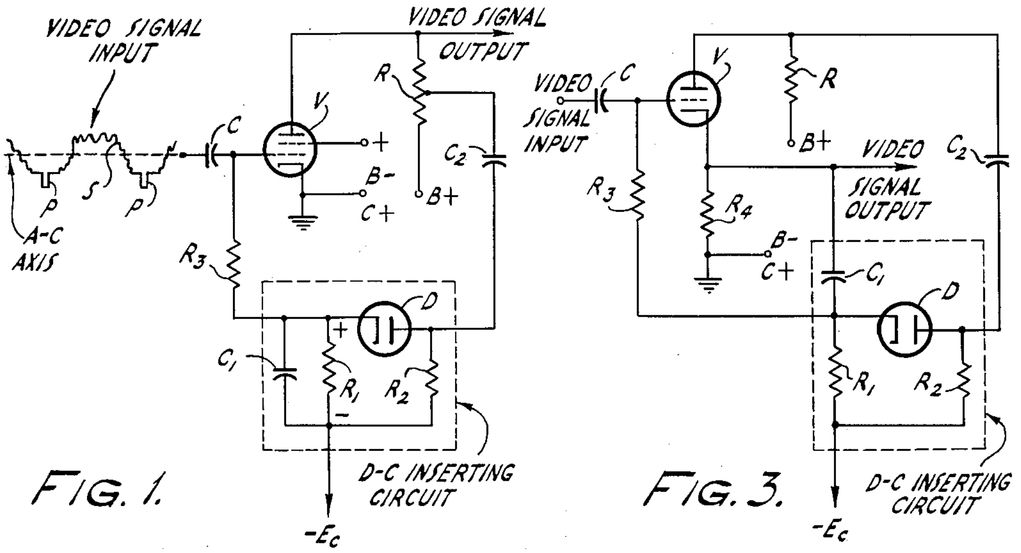
Fig. 1 is a schematic representation of a D.-C. reinserting circuit in accordance with the present invention.
Fig. 3 is a modification of the circuit of Fig. 1.

Referring now to the drawing and to Fig. 1 in particular, there is shown an electron discharge tube V forming part of the video signal circuit of a television receiver. While tube V is shown at a tetrode having an anode, a cathode, a control electrode, and a screen electrode, it will be obvious as the description proceeds that electron discharge devices having other numbers of electrodes may readily be employed in place of the particular tube illustrated. The cathode of tube V is grounded directly as shown, while the anode of the tube is connected to a source of positive operating potential B+ through the load resistor R.

A composite television signal, including synchronizing pulses P and picture information S, is impressed upon the control electrode of tube V through the coupling condenser C. This signal acts to modify the electron flow within tube V thereby to develop a varying output voltage across the load resistor R. The output voltage thus developed will be of the same general waveform as the input signal after circuit equilibrium is reached, but will be reversed in polarity and will have an amplitude determined by the amplification factor of the tube, the plate resistance of the tube, and the value of the load resistor R.

For inserting the proper direct-current component in the output signal, a network is employed which includes a diode D, a condenser $C_1$ and two resistors $R_1$ and $R_2$. A portion of the signal output of the tube V, as developed across resistor R, is applied to the anode of diode D (which may, for example, be a 6AL5) through a coupling condenser $C_2$. As shown in Fig. 1, the anode of diode D is connected to a source of negative biasing potential $-E_c$ through the resistor $R_2$. The cathode of diode D is connected to this same source of negative biasing potential $-E_c$ through the resistor $R_1$. Consequently, in the absence of a video input signal, both the anode and the cathode of diode D are initially at the same negative potential, which is the fixed bias applied to output tube V.

When the video signal output of tube V is applied to the anode of diode D, however, the latter is rendered conductive, and current flows in the diode circuit including resistors $R_1$ and $R_2$. This flow of diode current causes a potential drop across resistor $R_1$ having the polarity indicated in the drawing. A condenser $C_1$ is connected in parallel with resistor $R_1$, so that the potential across resistor $R_1$ appears as a charge on condenser $C_1$. The time constant of the elements $C_1R_1$ is preferably such that the charge on condenser $C_1$ is maintained substantially constant during the rapid variations in picture content that occur within a single line-scanning interval. This charge, therefore, is representative of the average brilliance of the optical image, inasmuch as the amount of energy rectified by the diode D is proportional to variations in the height of the synchronizing pulses P relative to the A.-C. axis of the input signal. For example, a video signal containing a considerable amount of highlight illumination will have its A.-C. axis at a relatively greater distance from either black level or from the synchronizing pulse tips than will a picture which is predominantly dark. The voltage on condenser $C_1$ therefore, varies directly with variation in the distance between the A.-C. axis of the input signal to tube V and the tips of the synchronizing pulses contained therein.

The fixed control grid bias of tube V in Fig. 1 is supplied by the negative bias source $-E_c$ through the two series-connected resistors $R_3$ and $R_1$, the former being of relatively large value and serving as the usual grid resistor for the tube. Consequently, when no signal is being passed by the tube V, the negative voltage on the control electrode of the tube will be the full voltage of source $-E_c$. This fixed bias is so selected as to place the tube substantially at cut-off in the absence of an incoming signal. When such a signal is received by tube V, however, the bias on the control electrode of the tube is changed in a manner now to be set forth.

The portion of the video signal output of tube V which is applied to the anode of diode D is rectified, and a control voltage developed on condenser $C_1$ which is substantially equal to the voltage differential between the tips of the synchronizing pulses P in the input signal and the A.-C. axis thereof. This result is made possible by a suitable choice of values for resistors R, $R_1$, and $R_2$, the latter being quite small relative to the other diode resistor $R_1$. The potential drop across resistor $R_1$, therefore, approximates the actual peak value of the applied signal.

However, the charge thus developed on condenser $C_1$ is of such polarity as to oppose the negative bias voltage supplied to the control electrode of tube V from the bias source $-E_c$. The actual operating bias of tube V, therefore, is no longer that supplied by the source $-E_c$ alone, but is instead a voltage representing the difference between the output of source $-E_c$ and the voltage developed across condenser $C_1$.

Figure 2:
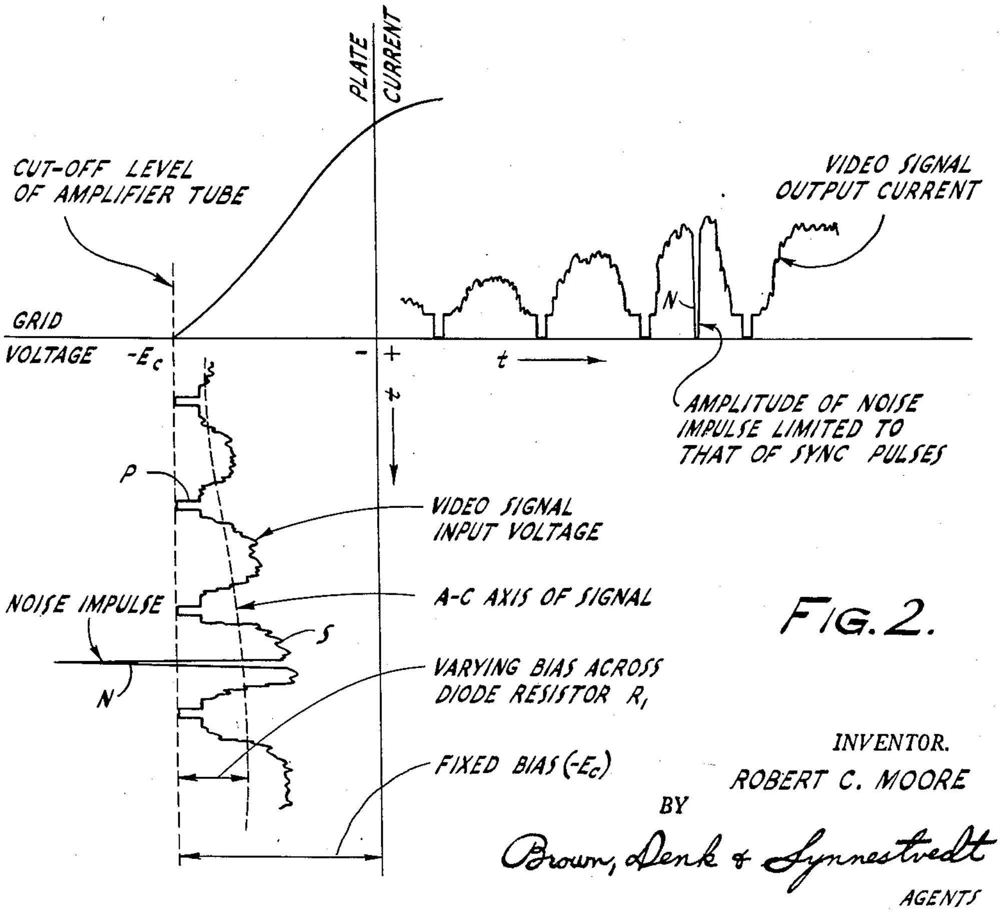
Fig. 2 is a graph illustrating the operation of the circuit of Fig. 1.

The above mode of operation is perhaps more readily seen by reference to the graph of Fig. 2, in which the input signal wave is shown in relation to the operating characteristic ($E_c$—$I_b$) of tube V. As shown in this graph, the grid bias $-E_c$ acts (in the absence of an incoming signal) to maintain tube V substantially at cut-off. Hence, it will be appreciated that application of the composite television signal to tube V (with the sync pulses extending in a negative direction) would normally result in an output being obtained in which these synchronizing pulses are not present. Even if the tube bias were reduced so that the pulses were fully transmitted, it is apparent that they would occupy different voltage level in the output signal as a result of variations in picture content.

However, by applying the varying voltage across resistor $R_1$ to modify the fixed bias $-E_c$, this undesirable mode of operation is overcome in the manner shown in Fig. 2. The actual operating bias of tube V in the circuit of Fig. 1 accordingly becomes the difference between the fixed bias $-E_c$ and the varying bias appearing across resistor $R_1$. Since this differential bias varies with variations in the height of the sync pulses P, it acts in the manner shown by Fig. 2 to maintain the tips of these synchronizing pulses substantially at the cut-off point of the amplifier tube. This produces a signal output in which the synchronizing pulses always occupy the same level, and in which the D.-C. component of the transmitted signal has been reinserted so as to insure accurate image reproduction.

It frequently happens that noise impulses of considerable amplitude are present in the signal during the line-scanning period. Inasmuch as a number of known D.-C. inserting circuits operate on the principle of rectifying the total energy content in the signal, the presence of such noise often results in the development of a considerably greated D.-C. voltage than is actually representative of the picture information itself. It will be noted, however, that in applicant's arrangement tube V is operated at cut-off in the absence of a signal. Furthermore, the television signal is applied to the tube with such polarity that the synchronizing pulses extend in a negative direction. Thus a noise impulse N (Fig. 2) of large amplitude is prevented from developing an appreciable voltage on condenser $C_1$ due to the fact that its output amplitude is limited to that of the synchronizing pulses P. The remainder of the noise impulse is clipped off, since it extends beyond the cut-off level of the tube. Furthermore, noise impulses such as N, while frequently of large amplitude, are likewise normally of short duration, and hence their energy content after clipping is rather low. Thus, the voltage on condenser $C_1$, which is representative of the signal energy content, is not appreciably affected by the presence of these spurious short-duration impulses.

In Fig. 3 a modification of the circuit of Fig. 1 is illustrated wherein tube V is connected to act as a cathode follower, with the output voltage of the tube, as developed across the cathode resistor $R_4$, applied to the cathode of diode D through the condenser $C_1$. In the circuit of Fig. 3, the anode resistor R of tube V is so chosen as to supply only enough signal voltage to the anode of diode D to ensure the production of the required bias across resistor $R_1$. In general, the proper bias voltage is developed across $R_1$ when the total cathode-to-plate signal on diode D is approximately equal to the video input signal appearing on the control electrode of tube V. With resistor $R_2$ being made considerably smaller than resistor $R_1$, most of the diode voltage will appear across the latter, and will be effective in reducing the negative bias voltage of $-E_c$ as applied to the control electrode of tube V through resistor $R_3$ in the same manner as set forth in connection with the description of Fig. 1. The output of tube V will be of negative polarity—that is, the synchronizing pulses will extend in a negative direction rather than in a positive direction as is the case in the circuit of Fig. 1.

The following values are illustrative of those which may be employed for the components indicated in Fig. 3. However, it will be appreciated that other values may be given to any or all of these elements as may seem desirable or necessary:

| | |
|---|---|
| V, type 6C4 | C, .05 mf. |
| R, 3300 ohms | $C_1$, .015 mf. |
| $R_1$, 2.7 megohms | $C_2$, .1 mf. |
| $R_2$, 33,000 ohms | $-E_c$, −14 volts |
| $R_3$, 1 megohm | B+, +200 volts |
| $R_4$ 4700 ohms | |

Having thus described my invention, I claim:

In a television system, an amplifier tube having an anode, a cathode and at least one control electrode, the control electrode of said tube being adapted to receive thereon a composite television signal which lacks a D. C. component, means for connecting the cathode of said tube to ground, a source of negative bias voltage, a pair of resistors connected between said source of negative bias voltage and the control electrode of said amplifier tube, a third resistor, a diode having its cathode connected to a point intermediate said pair of resistors and its anode connected to said source of negative bias voltage through said third resistor, an impedance connected in the anode circuit of said amplifier tube and across which a voltage is developed during conduction of said tube, a condenser, means for applying the voltage developed across at least a portion of said impedance to the anode of said diode through said condenser, an output resistor connected between the cathode of said amplifier tube and ground, means for deriving from said output resistor a television signal output which contains a direct current component, and means for applying at least a portion of the television signal output of said amplifier tube as derived from said output resistor to the cathode of said diode.

ROBERT C. MOORE.

REFERENCES CITED

The following references are of record in the file of this patent:

UNITED STATES PATENTS

| Number | Name | Date |
|---|---|---|
| 2,227,026 | Schlesinger | Dec. 31, 1940 |
| 2,254,114 | Wilson | Aug. 26, 1941 |
| 2,295,059 | Smyth | Sept. 8, 1942 |
| 2,525,103 | Sprecher | Oct. 10, 1950 |

FOREIGN PATENTS

| Number | Country | Date |
|---|---|---|
| 46,154 | France | Mar. 6, 1936 |
| [1] 444,049 | Great Britain | Mar. 12, 1936 |
| 505,899 | Great Britain | May 15, 1939 |

[1] (Duplicate of French Ad. #46,154.)